United States Patent
Kang et al.

(10) Patent No.: US 9,344,231 B2
(45) Date of Patent: May 17, 2016

(54) METHOD OF USER EQUIPMENT SEARCHING FOR CONTROL INFORMATION IN MULTI-NODE SYSTEM AND APPARATUS USING THE SAME

(75) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 14/232,088

(22) PCT Filed: Jul. 11, 2012

(86) PCT No.: PCT/KR2012/005489
§ 371 (c)(1),
(2), (4) Date: Jan. 10, 2014

(87) PCT Pub. No.: WO2013/009088
PCT Pub. Date: Jan. 17, 2013

(65) Prior Publication Data
US 2014/0126531 A1    May 8, 2014

Related U.S. Application Data

(60) Provisional application No. 61/506,645, filed on Jul. 12, 2011.

(51) Int. Cl.
*H04L 5/00* (2006.01)
*H04L 1/00* (2006.01)

(52) U.S. Cl.
CPC ............ *H04L 5/0007* (2013.01); *H04L 1/0091* (2013.01); *H04L 5/0053* (2013.01); *H04L 5/0094* (2013.01); *H04L 5/001* (2013.01)

(58) Field of Classification Search
CPC .............................. H04L 5/007; H04L 1/0091
USPC ........................................................... 370/330
See application file for complete search history.

(56) References Cited

U.S. PATENT DOCUMENTS

| | | |
|---|---|---|
| 2007/0206559 A1* | 9/2007 | Cho et al. ............ 370/344 |
| 2010/0165847 A1 | 7/2010 | Kamuf et al. |
| 2011/0044391 A1 | 2/2011 | Ji et al. |
| 2011/0075624 A1* | 3/2011 | Papasakellariou et al. ... 370/329 |
| 2011/0170496 A1* | 7/2011 | Fong et al. ............ 370/329 |
| 2012/0294248 A1 | 11/2012 | Seo et al. |

FOREIGN PATENT DOCUMENTS

WO    WO 2011/074868 A2    6/2011

* cited by examiner

*Primary Examiner* — Ian N Moore
*Assistant Examiner* — Mewale Ambaye
(74) *Attorney, Agent, or Firm* — Birch, Stewart, Kolasch & Birch, LLP

(57) ABSTRACT

There are provided a method of user equipment searching for control information and an apparatus using the same. The method includes receiving information about the position of an Enhanced-Physical Control Format Indication Channel (E-PCFICH) from a base station, receiving an E-PCFICH based on the information about the position of the E-PCFICH, obtaining information about the frequency band of an Enhanced Physical Downlink Control Channel (E-PDCCH) region through the E-PCFICH, and searching the E-PDCCH region for an E-PDCCH for the user equipment, wherein the E-PCFICH is transmitted in an OFDM symbol between a Physical Downlink Control Channel (PDCCH), transmitted in the first N (N is one of natural numbers 1 to 4) Orthogonal Frequency Division Multiplexing (OFDM) symbols of a sub-frame in the time domain, and the E-PDCCH region.

10 Claims, 12 Drawing Sheets

US 9,344,231 B2

METHOD OF USER EQUIPMENT SEARCHING FOR CONTROL INFORMATION IN MULTI-NODE SYSTEM AND APPARATUS USING THE SAME

CROSS REFERENCE TO RELATED APPLICATIONS

This application is the National Phase of PCT/KR2012/005489 filed on Jul. 11, 2012, which claims priority under 35 U.S.C. 119(e) to U.S. Provisional Application No. 61/506,645 filed on Jul. 12, 2011, all of which are hereby expressly incorporated by reference into the present application.

TECHNICAL FIELD

The present invention relates to wireless communication and, more particularly, to a method of user equipment searching for control information in a multi-node system and an apparatus using the same.

BACKGROUND ART

Recently, the data transfer rate over a wireless communication network is rapidly increasing. This results from the appearance and spread of a variety of devices, such as smart phones and tablet PCs which require Machine-to-Machine (M2M) communication and a high data transfer rate. In order to meet a higher data transfer rate, Carrier Aggregation (CA) technology and Cognitive Radio (CR) technology for efficiently using more frequency bands and multiple antenna technology and multiple base station cooperation technology for increasing the data capacity within a limited frequency are recently are highlighted.

Furthermore, a wireless communication network is evolving toward a tendency that the density of accessible nodes around a user is increasing. Here, the term 'node' may mean antennas or a group of antennas which are spaced apart from one another in a Distributed Antenna System (DAS). However, the node is not limited to the meaning, but may be used as a broader meaning. That is, the node may become a pico eNB (PeNB), a home eNB (HeNB), a Remote Radio Head (RRH), a Remote Radio Unit (RRU), a relay, or distributed antennas (or group). A wireless communication system including nodes having a high density may have higher system performance through cooperation between nodes. That is, if the transmission and reception of each node are managed by one control station and thus the node is operated like an antenna or an antenna group for one cell, the nodes may have much more excellent system performance as compared with the case where the nodes are operated as independent base stations without cooperation. A wireless communication system, including a plurality of nodes and a base station for controlling a plurality of nodes, is hereinafter referred to as a multi-node system.

In a multi-node system, it may be necessary to send control information through radio resources distinguished from each other for each node. In this case, in order to correctly decode control information in radio resources through which the control information is transmitted, information about the size of radio resources may need to be informed.

SUMMARY OF INVENTION

Technical Problem

An object of the present invention is to provide a method of user equipment searching for control information in a multi-node system and an apparatus using the same.

Solution to Problem

In an aspect, there is provided a method of user equipment searching for control information, including receiving information about the size of an Enhanced-Physical Control Format Indication Channel (E-PCFICH) from a base station, receiving an E-PCFICH based on the information about the position of the E-PCFICH, obtaining information about the frequency band of an Enhanced Physical Downlink Control Channel (E-PDCCH) region through the E-PCFICH, and searching the E-PDCCH region for an E-PDCCH for the user equipment, wherein the E-PCFICH is transmitted in an OFDM symbol between a Physical Downlink Control Channel (PDCCH), transmitted in the first N (N is one of natural numbers 1 to 4) Orthogonal Frequency Division Multiplexing (OFDM) symbols of a subframe in the time domain, and the E-PDCCH region.

The E-PDCCH region may be any one of a plurality of E-PDCCH regions allocated to different frequency bands in the frequency domain of the subframe.

The E-PCFICH may exist in a specific position of resource blocks forming the E-PDCCH region.

The E-PCFICH includes information about the number of resource blocks forming the E-PDCCH region.

The information about the position of the E-PCFICH may be semi-statically configured.

The information about the frequency band of the E-PDCCH region may be dynamically changed for each subframe.

The E-PCFICH may include information about a frequency band for one E-PDCCH region.

The E-PCFICH may include information about a plurality of frequency bands for a plurality of E-PDCCH regions.

The E-PDCCH region may include information about the scheduling of data transmitted in any one of a plurality of nodes controlled by the base station.

The E-PDCCH region may be started from an OFDM symbol fixed in the subframe.

In another aspect, user equipment includes a Radio Frequency (RF) unit configured to send and receive radio signals and a processor coupled to the RF unit, wherein the processor receives information about the size of an Enhanced-Physical Control Format Indication Channel (E-PCFICH) from a base station, receives an E-PCFICH based on the information about the position of the E-PCFICH, obtains information about the frequency band of an Enhanced Physical Downlink Control Channel (E-PDCCH) region through the E-PCFICH, and searches the E-PDCCH region for an E-PDCCH for the user equipment, the E-PCFICH is transmitted in an OFDM symbol between a Physical Downlink Control Channel (PDCCH), transmitted in the first N (N is one of natural numbers 1 to 4) Orthogonal Frequency Division Multiplexing (OFDM) symbols of a subframe in a time domain, and the E-PDCCH region, and the E-PDCCH region is any one of a plurality of E-PDCCH regions allocated to different frequency bands in a frequency domain of the subframe.

Advantageous Effects of Invention

In accordance with the present invention, in a multi-node system, a node supports user equipment in a resource region for sending control information and supports a new channel for sending information about the size of the resource region. User equipment can correctly decode control information because it can know the frequency band of a resource region in which each node sends control information through a new channel through which information about the size of the resource region is transmitted.

MODE FOR THE INVENTION

The following technology may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA may be implemented using radio technology, such as Universal Terrestrial Radio Access (UTRA) or CDMA2000. TDMA may be implemented using radio technology, such as Global System for communications (GSM)/General Packet Radio Service (GPRS)/Enhanced Data Rates for GSM Evolution (EDGE). OFDMA may be implemented using radio technology, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with systems based on IEEE 802.16e. UTRA is part of a Universal Mobile Telecommunications System (UMTS). 3$^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advanced (LTE-A) is the evolution of LTE.

In order to classify a description, the present invention is assumed to be applied to an LTE-A system, but the technical spirit of the present invention is not limited thereto.

Figure 1:
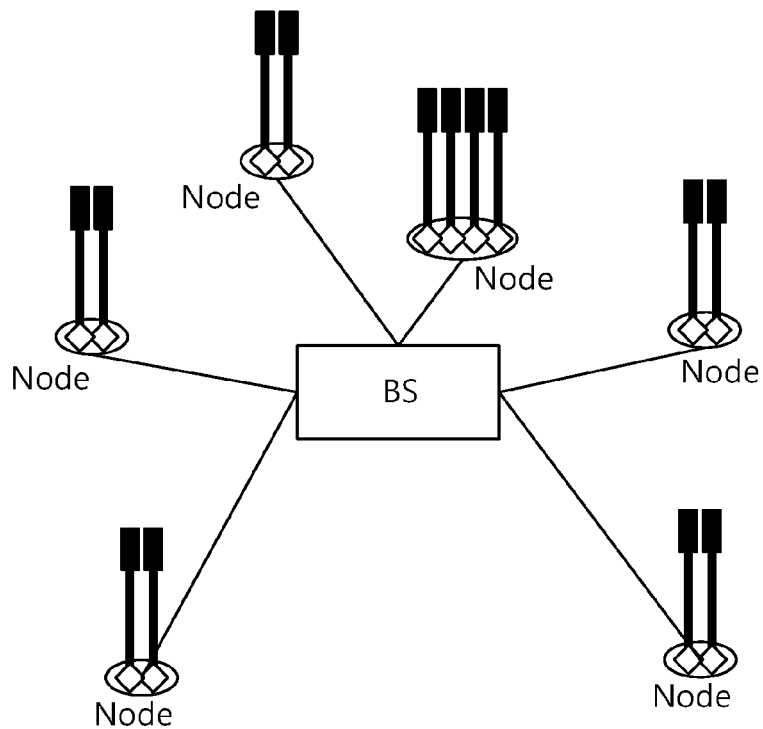
FIG. 1 shows an example of a multi-node system.

FIG. 1 shows an example of a multi-node system.

The multi-node system includes a Base Station (BS) and a plurality of nodes.

The BS provides communication service to a specific geographical area. The BS commonly refers to a fixed station that communicates with User Equipments (UEs), and it may also be called another terminology, such as an evolved-NodeB (eNB), a Base Transceiver System (BTS), or an Advanced Base Station (ABS).

FIG. 1 shows distributed antennas as an example of nodes. However, the nodes are not limited to the distributed antennas, but may be implemented using, for example, a macro BS, a picocell BS (PeNB), a home BS (HeNB), a Remote Radio Head (RRH), a relay. The nodes are also called points. The nodes may be connected to the BS and may be controlled or managed by the BS.

From a viewpoint of UE, a node may be identified or indicated through a Reference Signal (RS) or a pilot signal. The RS (hereinafter also called a pilot signal) refers to a signal known by both a transmission terminal and a reception terminal, and it is used for channel measurement and data demodulation. The RS may include, for example, a Channel Status Indication-Reference Signal (CSI-RS) defined in 3GPP LTE-A, a preamble defined in IEEE 802.16m, and a midamble. The RS or a configuration for the RS may be mapped to each node (or the transmit antenna of each node). If information about mapping between an RS configuration and a node is given to UE or UE previously knows the mapping information, the UE may identify the node or may be informed of the node based on the CSI-RS configuration and may calculate channel status information about the node. The RS configuration may include pieces of information about a configuration index, the number of antenna ports of each node, Resource Elements (REs) being used, and an offset about a transport period and a transport time. Accordingly, in this specification, technology in which UE measures a signal or generates channel status information for a specific node may mean that a signal for a specific RS is measured or channel status information is generated from a viewpoint of UE, for convenience of description.

Referring to back to FIG. 1, the nodes are connected to the BS in a wired/wireless manner. Each of the nodes may include one antenna or a plurality of antennas (i.e., an antenna group). Antennas belonging to one node are placed within several meters geographically, and may have the same characteristics. In a multi-node system, a node may function as an Access Point (AP) accessible to UE.

If the nodes consist of antennas as described above, this multi-node system is also called a Distributed Antenna System (DAS). That is, the DAS refers to a system in which the antennas (i.e., the nodes) are geographically distributed and placed in various positions and the antennas are managed by a BS. The DAS differs from a conventional Centralized Antenna System (CAS) in that the antennas of a BS are concentrated and placed at the center of a cell.

Here, the meaning that the antennas are geographically distributed and placed may mean that one receiver and a plurality of antennas are arranged so that a difference in the channel status between each of the antennas and the receiver is a specific value or higher when the receiver receives the same signal from the plurality of antennas. The meaning that the antennas are concentrated and placed may mean that the antennas are densely placed so that a difference in the channel status between each antenna and one receiver is less than a specific value. The specific value may be determined in various ways depending on the frequency and the type of service used in antennas.

In general downlink refers to communication from a BS or a node to UE, and uplink refers to communication from UE to a BS or a node.

Figure 2:
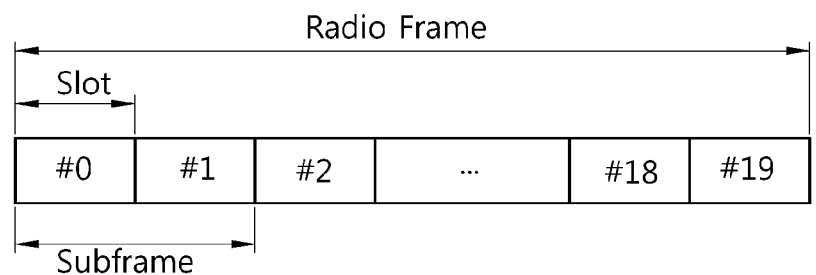
FIG. 2 shows the structure of a radio frame in 3GPP LTE.

FIG. 2 shows the structure of a radio frame in 3GPP LTE.

Referring to FIG. 2, the radio frame includes 10 subframes, and each of the subframes includes 2 slots. The slots within the radio frame are given slot numbers from #0 to #19. The time that one subframe is taken to be transmitted is called a Transmission Time Interval (TTI). The TTI may be called a scheduling unit for data transmission. For example, the length of one radio frame may be 10 ms, the length of one subframe may be 1 ms, and the length of one slot may be 0.5 ms.

The structure of the radio frame is only an example. Accordingly, the number of subframes included in the radio frame or the number of slots included in the subframe may be changed in various ways.

Figure 3:
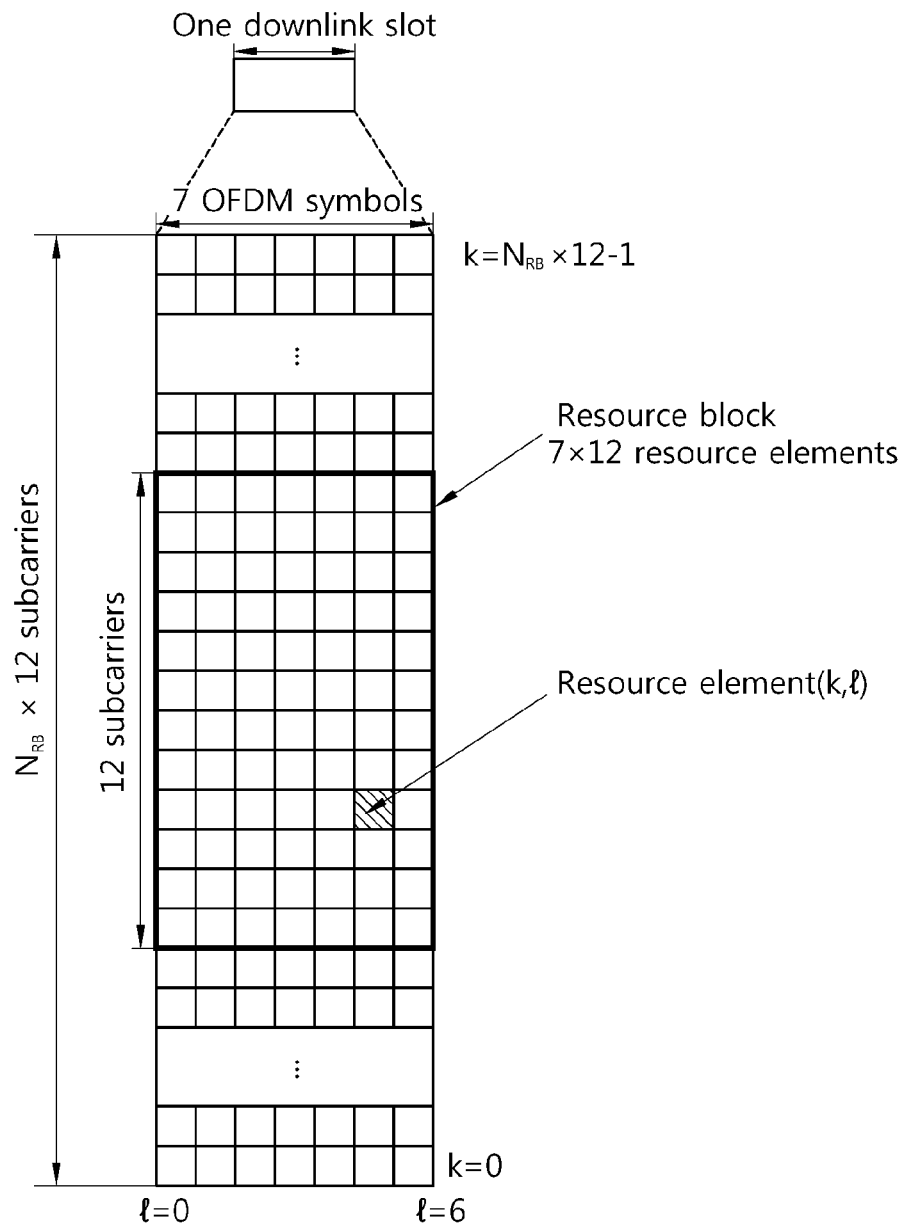
FIG. 3 shows an example of a resource grid for one slot.

FIG. 3 shows an example of a resource grid for one slot.

A slot includes a downlink slot and an uplink slot. The downlink slot includes a plurality of OFDM symbols in the time domain and includes $N_{RB}$ Resource Blocks (RBs) in the frequency domain. The OFDM symbol may also be called an SC-FDMA symbol depending on a transmission method. The RB is a resource allocation unit, and it includes one slot in the time domain and a plurality of contiguous subcarriers in the frequency domain. The RB includes a Virtual Resource Block (VRB), that is, a logical allocation unit, and a Physical Resource Block (PRB), that is, a physical allocation unit. The VRB and the PRB have the same size, but the index of the VRB and the index of the PRB may not be identical with each other.

The number $N_{RB}$ of RBs included in a downlink slot depends on a downlink transmission bandwidth configured in a cell. For example, in an LTE system, the number $N_{RB}$ may be any one of 6 to 110. An uplink slot may also have the same structure as a downlink slot.

An element on a resource grid is called a Resource Element (RE). The RE on the resource grid may be identified by an index pair (k,l) within a slot. Here, k(k=0, . . . , $N_{RB}$×12−1) is a subcarrier index within the frequency domain, and l(l=0, . . . , 6) is an OFDM symbol index within the time domain.

One RB is illustrated as including 7×12 REs including 7 OFDM symbols in the time domain and 12 subcarriers in the frequency domain but the number of OFDM symbols and the number of subcarriers within the RB are not limited thereto. The number of OFDM symbols and the number of subcarriers may be changed in various ways depending on the length of a CP and frequency spacing. For example, in case of a normal CP, the number of OFDM symbols may be 7 and in case of an extended CP, the number of OFDM symbols may be 6. In one OFDM symbol, the number of subcarriers may be one of 128, 256, 512, 1024, 1536, and 2048.

Figure 4:
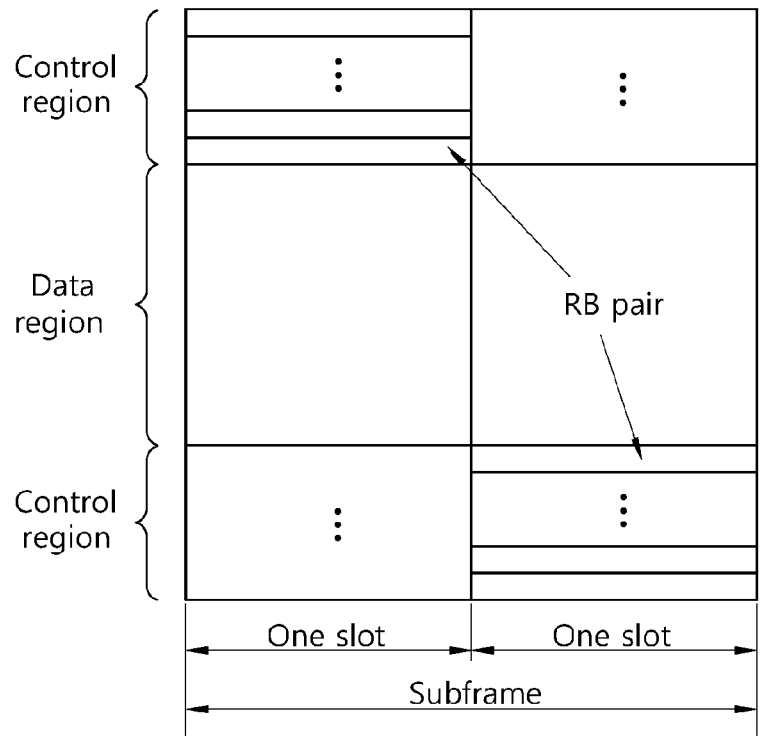
FIG. 4 shows the structure of an uplink subframe.

FIG. 4 shows the structure of an uplink subframe.

The uplink subframe may be divided into a control region and a data region in the frequency domain. A Physical Uplink Control Channel (PUCCH) on which uplink control information will be transmitted is allocated in the control region, and a Physical Uplink Shared Channel (PUSCH) on which data will be transmitted is allocated in the data region. UE may do not send a PUCCH and a PUSCH at the same time or may send a PUCCH and a PUSCH at the same time depending on a configuration.

A PUCCH for one UE is allocated in the form of an RB pair in a subframe. RBs belonging to an RB pair occupy different subcarriers in a first slot and a second slot. A frequency occupied by RBs belonging to an RB pair allocated to a PUCCH is changed on the basis of a slot boundary. This is called that the RB pair allocated to the PUCCH has been subject to frequency-hopped in the slot boundary. UE may obtain a frequency diversity gain by sending pieces of uplink control information through different subcarriers over time.

The pieces of uplink control information transmitted on the PUCCH include Hybrid Automatic Repeat request (HARQ) Acknowledgement (ACK)/Non-acknowledgement (NACK), Channel State Information (CSI) indicating a downlink channel status, and a Scheduling Request (SR), that is, an uplink radio resource allocation request. The CSI includes a Precoding Matrix Index (PMI) indicating a precoding matrix, a Rank Indicator (RI) indicating a rank value preferred by UE, and a Channel Quality Indicator (CQI) indicating a channel status.

A PUSCH is mapped to an Uplink Shared Channel (UL-SCH), that is, a transport channel. Uplink data transmitted on the PUSCH may be a transport block, that is, a data block for an UL-SCH transmitted for a TTI. The transport block may be user information. Alternatively, the uplink data may be multiplexed data. The multiplexed data may be the multiplexing of a transport block and control information for an UL-SCH. For example, control information multiplexed with data may include a CQI, a PMI, an HARQ ACK/NACK, and an RI. Alternatively, uplink data may consist of only control information.

Figure 5:
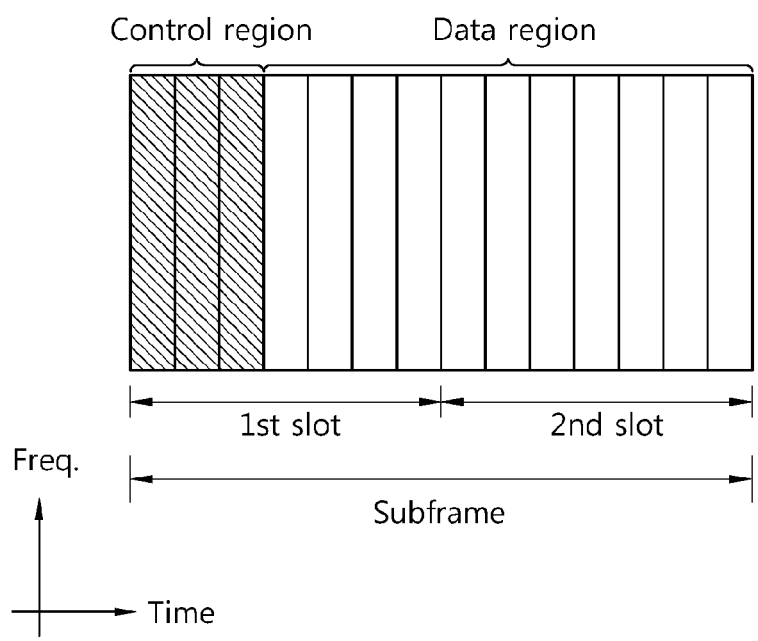
FIG. 5 shows the structure of a downlink subframe.

FIG. 5 shows the structure of a downlink subframe.

The downlink subframe includes two slots in the time domain, and each of the slots includes 7 OFDM symbols in a normal CP. A maximum of former 3 OFDM symbols of a first slot within the downlink subframe (i.e., a maximum of 4 OFDM symbols for a 1.4 MHz bandwidth) corresponds to a control region in which control channels are allocated. The remaining OFDM symbols correspond to a data region in which Physical Downlink Shared Channels (PDSCHs) are allocated. The PDSCH means a channel on which a BS or a node sends data to UE.

The control channels transmitted in the control region includes a Physical Control Format Indicator Channel (PCFICH), a Physical Hybrid-ARQ Indicator Channel (PHICH), and a Physical Downlink Control Channel (PDCCH).

A PCFICH transmitted in the first OFDM symbol of the downlink subframe carries a Control Format Indicator (CFI), that is, information about the number of OFDM symbols (i.e., the size of the control region), that is used to send control channels in the subframe. UE receives a CFI on a PCFICH and then monitors PDCCHs. Unlike the PDCCH, the PCFICH is transmitted through fixed PCFICH resources of a subframe without using blind decoding.

A PHICH carries a positive-acknowledgement (ACK)/negative-acknowledgement (NACK) signal for an uplink Hybrid Automatic Repeat Request (HARQ). An ACK/NACK signal for uplink data on a PUSCH transmitted by UE is transmitted on a PHICH.

Control information transmitted through a PDCCH is called Downlink Control Information (DCI). DCI may include information about the resource allocation of a PDSCH (this is also called a downlink (DL) grant), the resource allocation of a PUSCH (this is also called an uplink (UL) grant), and a set of transmit power control commands for individual UEs within a specific UE group and/or the activation of a Voice over Internet Protocol (VoIP).

Figure 6:
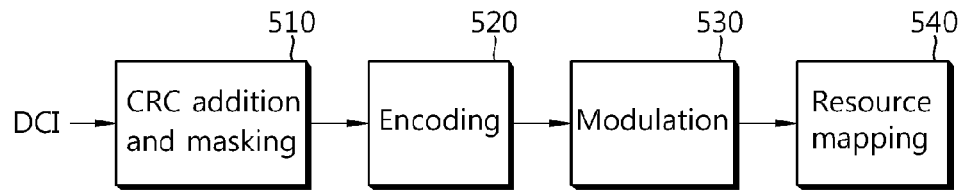
FIG. 6 is a block diagram showing a process of generating a PDCCH.

FIG. 6 is a block diagram showing a process of generating a PDCCH.

A BS determines a PDCCH format based on DCI to be transmitted to UE, attaches Cyclic Redundancy Check (CRC)

to the DCI, and masks a unique identifier (this is also called a Radio Network Temporary Identifier (RNTI)) to CRC depending on the owner or use of a PDCCH (510).

If the PDCCH is a PDCCH for specific UE, an identifier unique to the UE, for example, a Cell-RNTI (C-RNTI) may be masked to CRC. In an alternative embodiment, if the PDCCH is a PDCCH for a paging message, a paging indication identifier, for example, a Paging-RNTI (P-RNTI) may be masked to CRC. If the PDCCH is a PDCCH for system information, a system information identifier, that is, a System Information-RNTI (SI-RNTI) may be masked to CRC. In order to indicate a random access response, that is, a response to the transmission of a random access preamble by UE, a Random Access-RNTI (RA-RNTI) may be masked to CRC.

If a C-RNTI is used, a PDCCH carries control information for specific UE corresponding to a PDCCH (this is called UE-specific control information). If another RNTI is used, a PDCCH carries common control information received by all UEs or a plurality of UEs within a cell.

Coded data is generated by encoding the DCI to which CRC has been added (520). The encoding include channel encoding and rate matching The coded data is modulated, thereby generating modulation symbols (530).

The modulation symbols are mapped to a physical Resource Element (RE) (540). Each of the modulation symbols is mapped to the RE.

Figure 7:
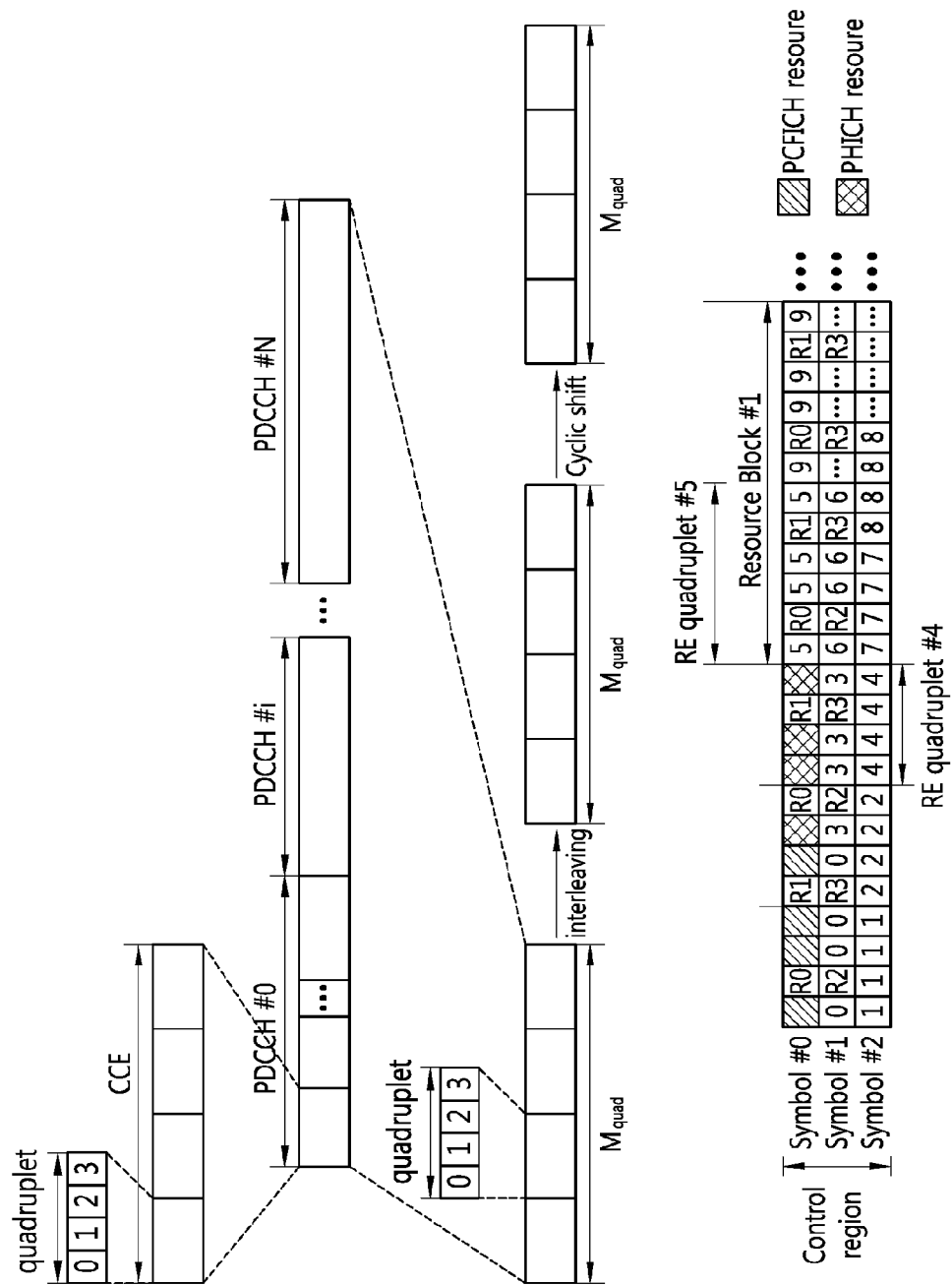
FIG. 7 shows an example of the resource mapping of a PDCCH.

FIG. 7 shows an example of the resource mapping of a PDCCH.

In FIG. 7, R0 indicates the RS of a first antenna port, R1 indicates the RS of a second antenna port, R2 indicates the RS of a third antenna port, and R3 indicates the RS of a fourth antenna port.

A control region within a subframe includes a plurality of Control Channel Elements (CCEs). The CCE is a logical allocation unit used to provide a PDCCH with a code rate according to the status of a radio channel, and it corresponds to a plurality of Resource Element Groups (REGs). A format of the PDCCH and the number of available bits of the PDCCH are determined depending on a correlation between the number of CCEs and the code rate provided by the CCEs.

One REG (indicated by a quadruplet in FIG. 7) includes four REs, and one CCE includes 9 REGs. {1, 2, 4, 8} CCEs may be used to configure one PDCCH, and each of the CCEs {1, 2, 4, 8} is called a CCE aggregation level.

That is, a PDCCH includes one or more CCEs, and it is mapped to physical resources after interleaving is performed for each REG and a cyclic shift based on a cell identifier (ID) is performed.

A plurality of PDCCHs may be transmitted in one subframe. UE monitors the plurality of PDCCHs for each subframe. Here, the term 'monitoring' means that the UE attempts to decode or detect the PDCCHs according to a PDCCH format.

In 3GPP LTE, blind decoding is used to detect PDCCHs. Blind decoding is also called blind detection. Blind decoding is a method of checking whether a PDCCH is its own control channel by demasking a desired ID to the CRC of a received PDCCH (this is called a candidate PDCCH) and checking a CRC error. UE performs the blind decoding because it does not know that its own PDCCH is transmitted using what CCE aggregation level or what DCI format in any position within a control region.

In 3GPP LTE, in order to reduce a load resulting from blind decoding, a Search Space (SS) is used. The search space may be called the monitoring set of CCEs for a PDCCH. UE monitors PDCCHs within a search space.

Figure 8:
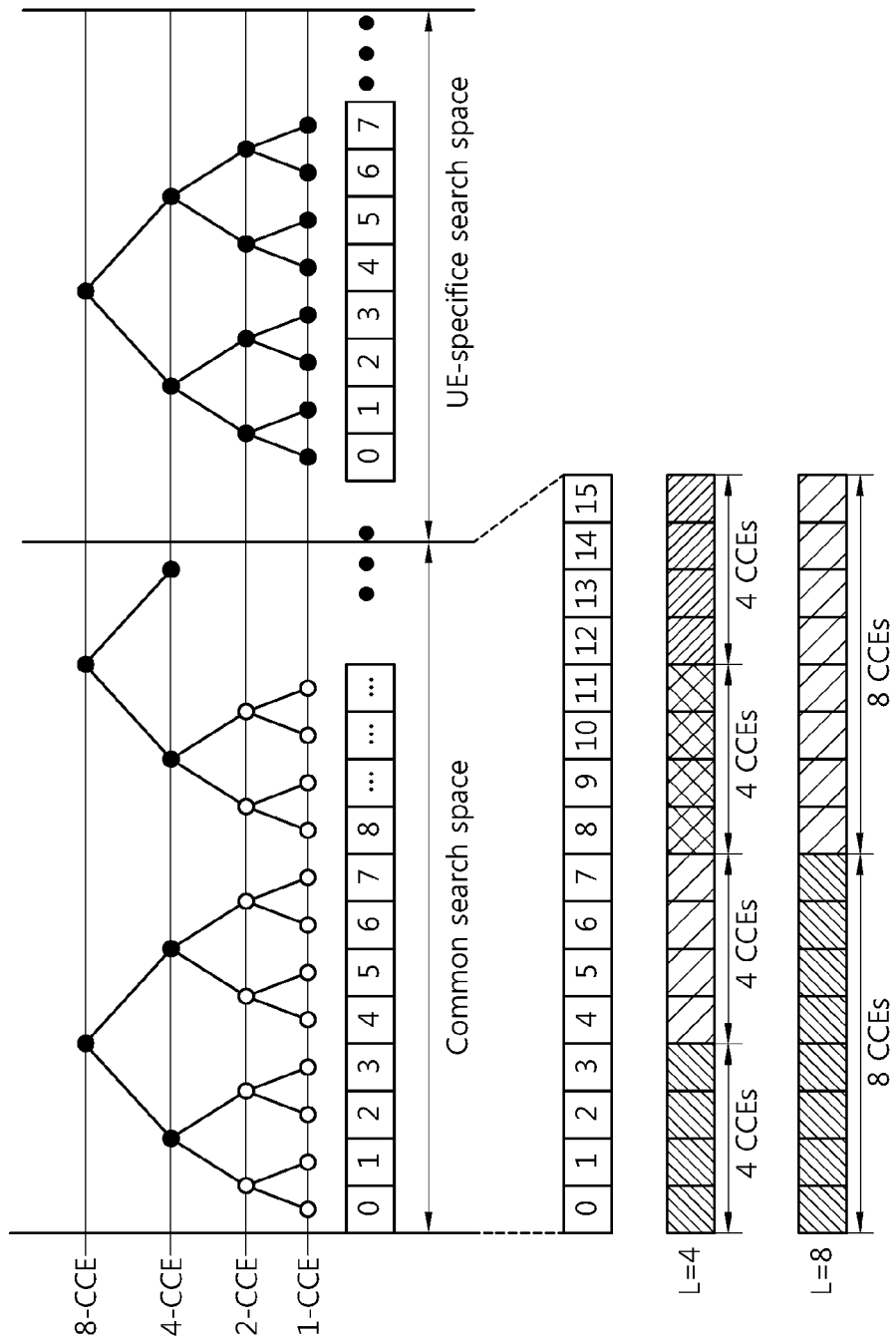
FIG. 8 is an exemplary diagram showing a common search space and a UE-specific search space for the monitoring of PDCCHs.

FIG. 8 is an exemplary diagram showing a common search space and a UE-specific search space for the monitoring of PDCCHs.

A search space is divided into a Common Search Space (CSS) and a UE-specific Search Space (USS). The CSS is a space where a PDCCH having common control information (this is also called cell-specific control information) is searched for. The CSS may include 16 CCEs from a CCE index 0 to a CCE index 15 and supports a PDCCH having CCE aggregation levels {4, 8}. However, a PDCCH (DCI formats 0 and 1A) that carries UE-specific information may also be transmitted in the CSS. The USS supports a PDCCH having CCE aggregation levels {1, 2, 4, 8}.

In a 3GPP LTE system, a PDCCH is used to control UE. A region to which the PDCCHs of a plurality of UEs are mapped is defined as a control region (or a PDCCH region). In general, a control region in which a PDCCH is transmitted is the foremost OFDM symbol period of a downlink subframe. In general, the control region in which a PDCCH is transmitted is set within a range of '3 OFDM symbols'. The control region in which a PDCCH is transmitted is set to a cell-specific value owing to limitations that all UEs have to be searched and is defined as a Control Format Indicator (CFI).

Figure 9:
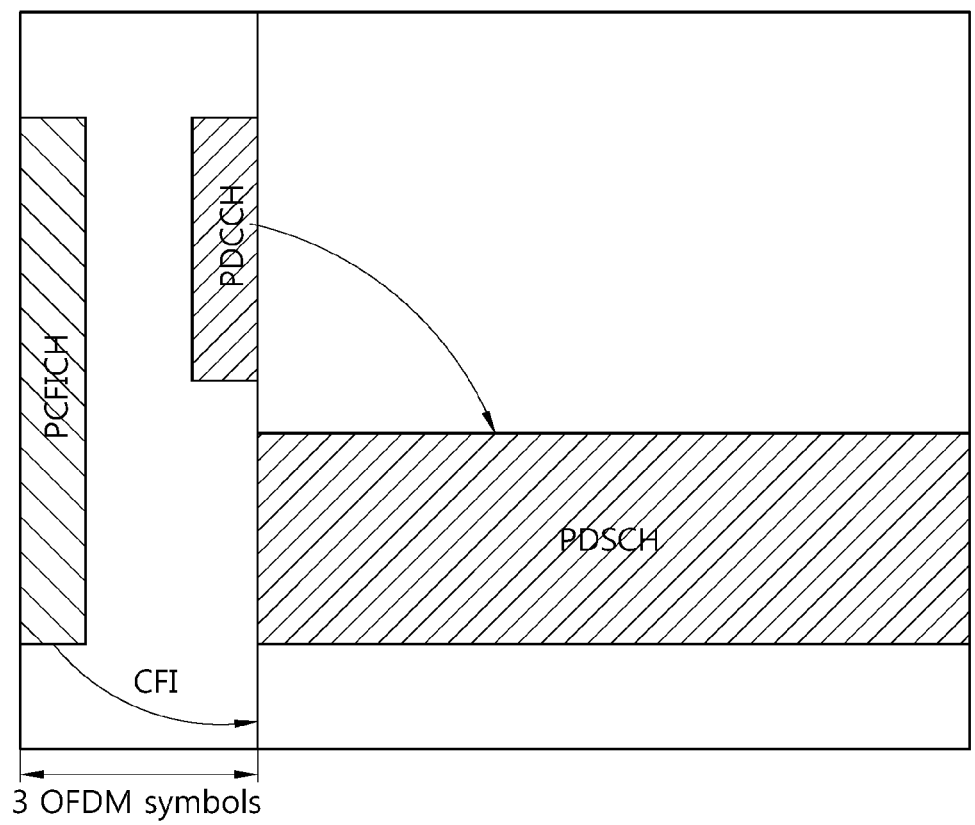
FIG. 9 shows an example in which information about the size of a PDCCH is received using a PCFICH.

FIG. 9 shows an example in which information about the size of a PDCCH is received using a PCFICH.

Referring to FIG. 9, a CFI is transmitted through a PCFICH, and it contains information about the OFDM symbol period of a control region. For example, if a CFI is 3 as in FIG. 9, a control region where UE has to detects its own PDCCH includes 3 OFDM symbol periods. The UE obtains its own data channels (i.e., a PDSCH/PUSCH) through the PDCCH detected in the control region.

Meanwhile, in LTE Rel.10, in order for a BS to send control information about a Relay Node (RN), an R-PDCCH has been newly designed.

Figure 10:
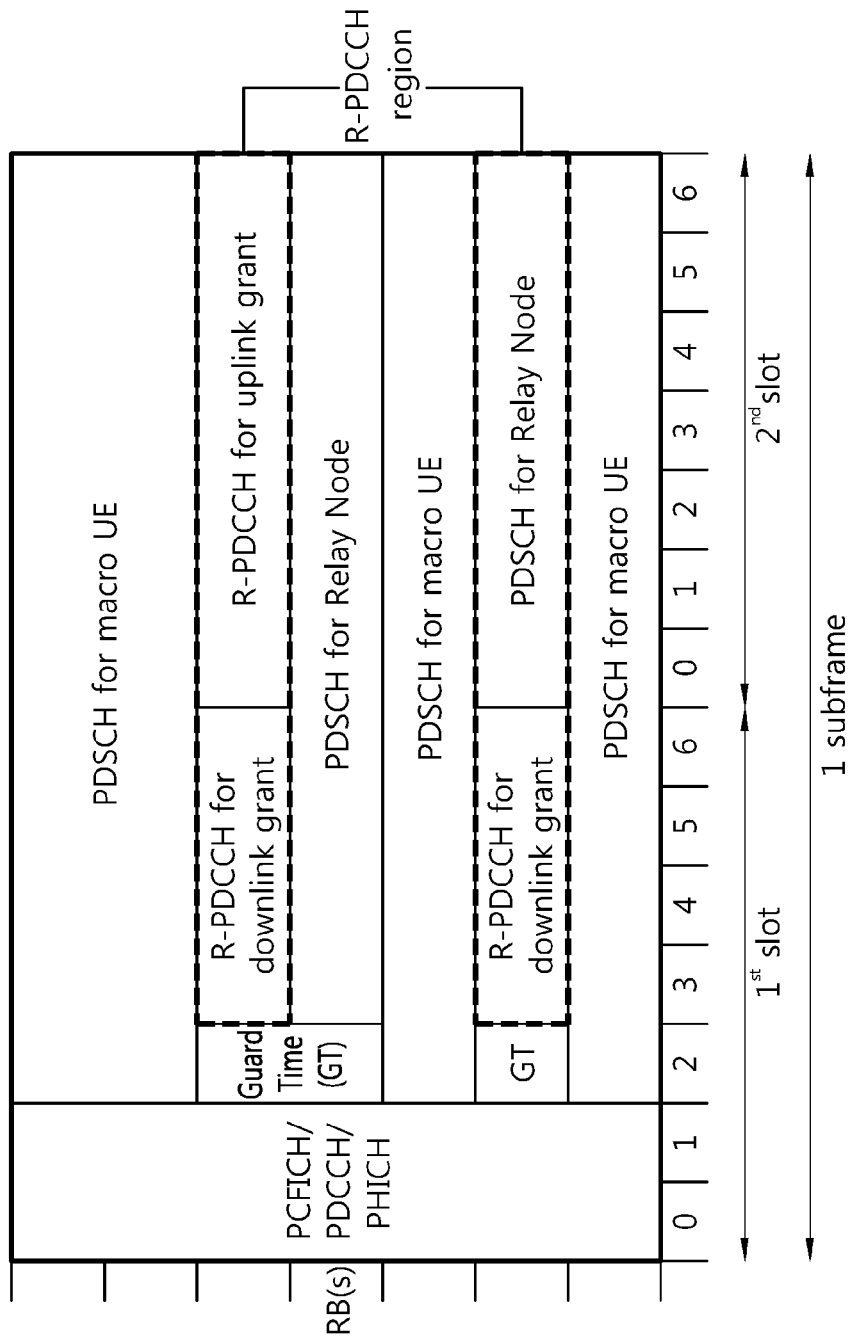
FIG. 10 shows an example of an R-PDCCH.

FIG. 10 shows an example of the R-PDCCH.

Referring to FIG. 10, the R-PDCCH may be placed in the first slot or second slot of one subframe. If the R-PDCCH is placed in the first slot, a downlink grant (i.e., PDSCH scheduling information) is provided to an RN through the R-PDCCH. If the R-PDCCH is placed in the second slot, an uplink grant (i.e., PUSCH scheduling information) is provided to an RN through the R-PDCCH.

A position where a potential R-PDCCH is transmitted in the frequency domain is signalized to an RN through RRC for each RB or Resource Block Group (RBG) depending on a resource allocation type. That is, one or more RBs are semi-statically configured as a potential frequency domain for R-PDCCH transmission. In a region where the potential R-PDCCH is transmitted (hereinafter referred to as an 'R-PDCCH region'), a plurality of R-PDCCHs may be multiplexed in order to send control information about different RNs.

The R-PDCCH region has the same position in the frequency domain in the first slot and the second slot of a subframe, but an R-PDCCH transmitted to a specific RN does not need to be always placed in the same frequency domain in the first slot and the second slot. That is, a downlink grant and an uplink grant transmitted to a specific RN may be transmitted in different frequency domains.

A method of multiplexing a plurality of R-PDCCHs chiefly includes two methods. The first method is to cross-interleave R-PDCCHs, and the second method is not to cross-interleave R-PDCCHs.

The first method complies with an operation in a legacy PDCCH. That is, one DCI is mapped to 1 to 8 Control Channel Elements (CCEs) depending on an aggregation level, and a plurality of the mapped DCIs is cross-interleaved in an REG unit including four contiguous Resource Elements (REs). If this method is used, a plurality of R-PDCCHs is mixed within one RB.

In the second method, each DCI is rate-matched with all the Res of the first or the second slot in 1 to 8 RBs depending on an aggregation level after experiencing a process of adding CRC and a channel coding process.

In case of the first method, UE receives an R-PDCCH by using a Cell-specific RS (CRS) (antenna ports 0 to 3) because a plurality of R-PDCCHs is mixed within one Physical RB (PRB). In case of the second method, UE may receive an R-PDCCH by using a demodulation RS (DM-RS) (using only antenna ports 7 to 10) as well as a CRS because there is only one R-PDCCH within one PRB.

In order to receive a downlink signal, such as a PDCCH or a PDSCH, from a BS, an RN configures a subframe on which the downlink signal will be received as a Multicast Broadcast Single Frequency Network (MBSFN) subframe for UE within an RN cell (hereinafter referred to as RN UE). Since the MBSFN subframe does not include a Physical Multicast channel (PMCH), RN UEs receive the PDCCH only during the first 2 OFDM symbol periods of the MBSFN subframe, but do not receive a signal during the remaining periods. Accordingly, the RN receives the R-PDCCH and the PDSCH by using the durations where the RN UEs do not receive a signal. The RN has to send the PDCCH to the RN UEs and to receive a signal from the BS during the first one to two OFDM symbol periods of a relevant subframe. In this case, a switching time is necessary between the transmission and the reception. With consideration taken of the switching time, the RN may receive a signal from the fourth OFDM symbol of the BS. Consequently, signals (i.e., an R-PDCCH and a PDSCH) transmitted from the BS to the RN are unconditionally transmitted from the position of the fourth OFDM symbol in the first slot of the subframe as in FIG. 10. In the frequency domain where there is an R-PDCCH or a PDSCH for the RN, there may be a Guard Time (GT) where a signal is not transmitted as in FIG. 10.

Information about a subframe configuration for an RN may be transmitted through a Radio Resource Control (RRC) message. The following message is an example of the RRC message.

```
-- ASN1START
RN-SubframeConfig-r10 ::=           SEQUENCE {
        frameStructureType-r10              CHOICE {
                fdd-r10                             FDD-SubframeConfig-r10,
                tdd-r10                             TDD-SubframeConfig-r10
        },
        rpdcch-Config-r10                   SEQUENCE {
                resourceAllocationType-r10          ENUMERATED {type0, type1, type2Localized, type2Distributed},
                resourceBlockAssignment-r10         CHOICE {
                        type01-r10                          CHOICE {
                                nrb6-r10                            BIT STRING (SIZE(6)),
                                nrb15-r10                   BIT STRING (SIZE(8)),
                                nrb25-r10                   BIT STRING (SIZE(13)),
                                nrb50-r10                   BIT STRING (SIZE(17)),
                                nrb75-r10                   BIT STRING (SIZE(19)),
                                nrb100-r10                          BIT STRING (SIZE,(25))
                        },
                        type2-r10                           CHOICE {
                                nrb6-r10                            BIT STRING (SIZE(5)),
                                nrb15-r10                   BIT STRING (SIZE(7)),
                                nrb25-r10                   BIT STRING (SIZE(9)),
                                nrb50-r10                   BIT STRING (SIZE(11)),
                                nrb75-r10                   BIT STRING (S1ZE(12)),
                                nrb100-r10                          BIT STRING (SIZE(13))
                        }
                },
                demodulationRS-r10                  CHOICE {
                        interleaving-r10                    ENUMERATED {crs},
                        noInterleaving-r10                  ENUMERATED {crs, dmrs}
                },
                pdsch-Start-r10                     INTEGER (1..3),
                pucch-Config-r10                    SEQUENCE {
                        n1-PUCCH-AN-port0-r10               INTEGER (0..2047),
                        n1-PUCCH-AN-port1-r10               INTEGER (0..2047)
                },
                ...
        }                                                                               OPTIONAL,    --
Need ON
        ...
}
FDD-SubframeConfig-r10 ::=          SEQUENCE {
        subframeConfigurationPatternFDD-r10   BIT STRING (SIZE(8))
}
TDD-SubframeConfig-r10 ::=          SEQUENCE {
        subframeConfigurationPatternTDD-r10   INTEGER (0..31)
}
-- ASN1STOP
```

Meanwhile, in system higher than 3GPP LTE Rel-11, in order to improve performance, a multi-node system including a plurality of nodes within a cell is expected to be introduced. Furthermore, a standardization task for applying various MIMO schemes and cooperation communication schemes which are being developed or will be applied in the future to a multi-node environment is in progress.

When a node is introduced, link quality is expected to be improved because various communication schemes, such as a cooperation method, can be used. However, in order to apply the various MIMO schemes and cooperation communication schemes to the multi-node environment, there is an urgent need to introduce a new control channel. For this reason, the control channel that will be newly introduced is an Enhanced-Physical Downlink Control CHannel (E-PDCCH) (it may also be called another terminology, such as an RRH-PDCCH or an x-PDCCH, but is hereinafter referred to as an E-PDCCH). In the E-PDCCH, not the existing control region (hereinafter referred to as a PDCCH region), but a data transport region (hereinafter referred to as a PDSCH region) is preferred as an allocation position. A problem that the existing PDCCH region may be insufficient can be solved because control information about a node can be transmitted to each UE through the E-PDCCH.

Figure 11:
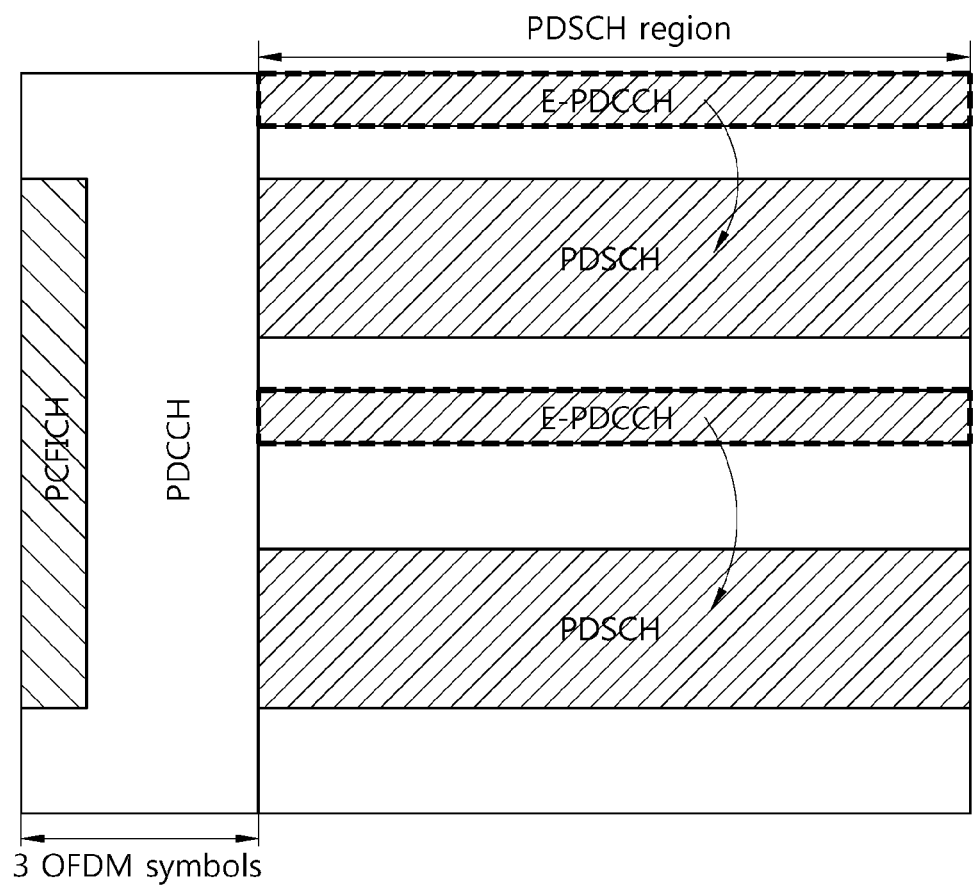
FIG. 11 shows an example in which E-PDCCHs are allocated and an example of scheduling through the E-PDCCHs.

FIG. 11 shows an example in which. E-PDCCHs are allocated and an example of scheduling through the E-PDCCHs.

An E-PDCCH is not provided to the existing LTE Rel 8-10 UEs, but may be searched for by UE of Rel-11 or higher and some region of a PDSCH may be allocated and used. For example, a part of the PDSCH region where data is transmitted may be defined as used as an E-PDCCH as in FIG. 11.

The E-PDCCH is similar to an R-PDCCH in that it is a control channel where the PDSCH transport region is placed and reception is possible using a DM-RS. A difference between the E-PDCCH and the R-PDCCH lies in that the subject of reception is UE in the E-PDCCH and the subject of reception is an RN in the R-PDCCH.

UE has to perform a blind decoding process of detecting whether its own E-PDCCH exists or not. If the number of UEs that haves accessed to a node is increased, however, the number of times of blind decoding that must be performed by the UEs is increased because more E-PDCCHs are allocated within a PDSCH region, with the result that complexity may be increased.

The present invention is hereinafter described. In the present invention, in order to minimize an impact due to a change of the existing standard specification, an E-PDCCH structure is provided while reusing the R-PDCCH structure to a maximum and an E-PCFICH structure indispensable in an E-PDCCH is provided.

As described above, information about the size and position of the R-PDCCH is transferred to an RN through an RRC message. That is, the information about the size and position of the R-PDCCH is semi-statically provided to the RN. A channel environment is static because there are RNs equal to the number of RNs determined in a fixed position within a cell and also a probability that the amount of control information will be instantly greatly changed is low. Accordingly, semi-static scheduling may be effective. However, the E-PDCCH is a control channel from a BS to UE having mobility. Accordingly, a channel environment may be dynamically changed, and the number of UEs that must be provided with service by a BS may be frequently changed. As a result, the amount of control information that must be transmitted by the BS may also be instantly changed. For this reason, there is a need for an E-PCFICH, that is, a dedicated channel for informing UE of the size and number of E-PDCCHs that are dynamically changed.

1. E-PDCCH Region

The E-PDCCH region refers to a region where a BS or a node may send an E-PDCCH. From a standpoint of the frequency domain, the E-PDCCH may exist in a specific frequency domain, such as an R-PDCCH, for example, a specific region scheduled in the unit of an RB. In the present invention, the E-PDCCH region may be determined in a cell-specific way or a node-specific way. The meaning that the E-PDCCH region is determined in a cell-specific way means that an E-PDCCH is transmitted by using a common resource region in all nodes within a cell. The meaning that the E-PDCCH region is determined in a node-specific way means that an E-PDCCH is transmitted by using a resource region determined for each node within a cell.

Figure 12:
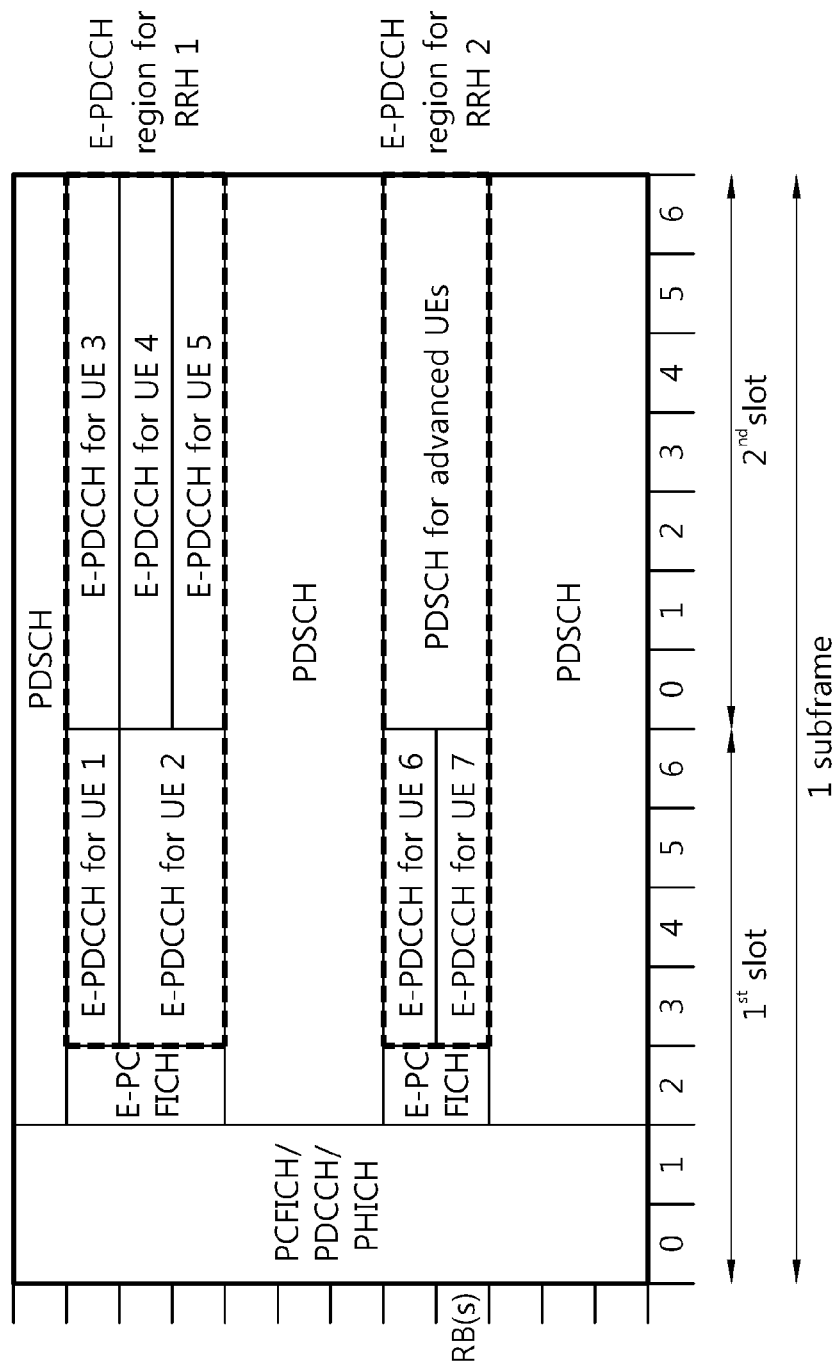
FIG. 12 shows an example of a node-specific E-PDCCH region.

FIG. 12 shows an example of a node-specific E-PDCCH region.

Referring to FIG. 12, an E-PDCCH region 1 where an RRH 1 may send an E-PDCCH and an E-PDCCH region 2 where an RRH 2 may send an E-PDCCH are allocated to different RBs. From a viewpoint of the time domain, the E-PDCCH region may exist in both the first and the second slots of a subframe like the R-PDCCH, or may exist only in the first slot of the subframe.

As shown in FIG. 12, in the present invention, different E-PDCCH regions are subject to Frequency Division Multiplexing (FDM) and allocated for each node. UE may detect its own E-PDCCH in an E-PDCCH region for a node from which a signal will be received through blind decoding.

FIG. 12 illustrates only the E-PDCCH regions for two nodes, but not limited thereto.

In general, UE that will receive a PDSCH from an RRH n detects its own E-PDCCH in an E-PDCCH region corresponding to the RRH n through blind decoding.

In order for UE to detect a target E-PDCCH within an E-PDCCH region, a size in the frequency domain of the E-PDCCH region, for example, information about the number of RBs is necessary. This is because the E-PDCCH region may be dynamically changed depending on the number of UEs and the amount of traffic.

In the present invention, the E-PCFICH provides UE with information about the size of an E-PDCCH region (i.e., the number of RBs) which is dynamically changed (e.g. for each subframe). The position of the E-PCFICH may be changed statically or semi-statically. UE receives an E-PCFICH placed in a designated position within each subframe and obtains information about the size of the E-PDCCH region from the received E-PCFICH.

2. E-PCFICH

The E-PCFICH provides UE with an E-CFI (enhanced-control format indicator), that is, instant size information (i.e., the number of RBs) in the frequency domain of an E-PDCCH region. If there are a number of E-PDCCH regions within a cell (e.g. node-specific E-PDCCH regions), one E-CFI may include information about the size of one E-PDCCH region or a plurality of E-PDCCH regions. In a system including a plurality of E-PDCCH regions, only one E-PCFICH may exist or a plurality of E-PCFICH regions (e.g., one E-PCFICH for one E-PDCCH region) may exist.

A method of configuring the E-CFI may include 1) a method of configuring information about the size of a plurality of E-PDCCH regions (i.e., the number of RBs) as one E-CFI and 2) a method of configuring information about the size of each E-PDCCH region (i.e., the number of RBs) as a different E-CFI.

In case of 1) method, the E-CFI may configure information about the size of a plurality of E-PDCCH regions as one Information Element (IE). The following table is an example of information about the size of a plurality of E-PDCCH regions using one IE. In Table 1, Q may be a value determined depending on a system band.

TABLE 1

| E-CFI | MEANING |
|---|---|
| 0 | No E-PDCCH regions exist. |
| 1 | All E-PDCCH regions are Q RB sized. |
| 2 | All E-PDCCH regions are 2Q RB sized. |
| 3 | Odd-numbered E-PDCCH regions are Q RB sized, and even-numbered E-PDCCH regions are 2Q RB sized. |
| 4 | Odd-numbered E-PDCCH regions are 2Q RB sized, and even-numbered E-PDCCH regions are Q RB sized. |

As shown in Table 1, the size of the E-PDCCH region may be defined as one E-CFI. For example, as shown in Table 1, if a value of the E-CFI is 1, all E-PDCCH regions may be formed of Q RBs, and if a value of the E-CFI is 3, odd-numbered E-PDCCH regions of E-PDCCH regions may be formed of Q RBs and even-numbered E-PDCCH regions of E-PDCCH regions may be formed of Q RBs.

In case of 2) method, each E-CFI indicates information about the size of a relevant E-PDCCH region and it may be transmitted through different physical resources (Resource Element (RE)). Here, physical resources that transfer different E-CFIs may be combined to form one E-PCFICH, or a channel that transfers each E-CFI may form an additional E-PCFICH (e.g. an E-PCFICH for each E-PDCCH region). That is, the former is a method of sending a plurality of E-CFIs (e.g., an E-CFI #1 for an E-PDCCH region #1, an E-CFI #2 for an E-PDCCH region #2, . . . ) in one E-PCFICH, and the latter is a method of sending only one E-CFI in one E-PCFICH. In case of the former, a plurality of E-CFIs may be connected to form one bitmap form. For example, if bit information transmitted through an E-PCFICH has a form [xxyyzz], xx may be defined to indicate an E-CFI for an E-PDCCH region #1, yy may be defined to indicate an E-CFI for an E-PDCCH region #2, and zz may be defined to indicate an E-CFI for an E-PDCCH region #3.

The position of the E-PCFICH may be previously determined or may be semi-statically configured for UE through a high layer signal, such as an RRC message.

If the position of the E-PCFICH is previously determined, the position of the E-PCFICH may be determined by one or more parameters, such as a system band, a cell-ID, and a node-ID (when a different CSI-RS is transmitted for each node, the node ID may be replaced with a CSI-RS configuration number, a CSI-RS subframe configuration number, or an RS port number).

If the position of the E-PCFICH is determined through a high layer signal, such as an RRC message, the position of the E-PCFICH may be determined by using i) a method of including information about the position of the E-PCFICH in scheduling information according to a resource allocation type transmitted through the RRC message and sending the scheduling information and ii) a method of defining a candidate region where an E-PCFICH may be placed, including a position index for a region where the E-PCFICH is actually transmitted in the RRC message, and sending the RRC message.

A position relationship between an E-PCFICH and an E-PDCCH region is described below.

An E-CFI includes only information about the size of an E-PDCCH region (e.g., the number of RBs). In order for UE to know that E-PDCCH regions equal to what RBs exist based on what position, the reference position of the E-PDCCH region must be defined. For example, assuming that an E-PDCCH region exists from a Virtual RB (VRB) #M to a VRB # (M+L) which are contiguous to each other, it is necessary to define M because an E-CFI signalizes only L. In this example, M is a value indicating the reference position of the E-PDCCH region. The reference position of the E-PDCCH region may be operated in conjunction with an E-PCFICH. In other words, the position of the E-PCFICH may be operated in conjunction with the reference position of the E-PDCCH region.

3. Position in the Frequency Domain of an E-PCFICH

An E-PCFICH may be placed in an RB region where an E-PDCCH region may be placed in the frequency domain, that is, in some region defined from a potential E-PDCCH region. For example, the E-PCFICH may be placed in the first Virtual Resource Block (VRB) of the potential E-PDCCH region.

As described above, if the position in the frequency domain of the E-PCFICH is limited to the RBs of the E-PDCCH region and the position of the E-PCFICH is operated in conjunction with the position from the frequency of the E-PDCCH region, there is an advantage in that signaling overhead is reduced because UE can induce the remaining positions from any one of the positions of the E-PCFICH and the E-PDCCH region. Furthermore, if an E-PCFICH is placed behind a PDCCH (within a PDSCH region) on the time side, it is difficult to allocate an RB including an E-PCFICH to a legacy UE because the legacy UE does not recognize the E-PCFICH. From this point of view, if an RB where an E-PCFICH is transmitted is placed within the RB of an E-PDCCH region, there is an advantage in that scheduling limitations to legacy UE is reduced as compared with the case where the E-PCFICH does not overlap with the RB of the E-PDCCH region.

Figure 13:
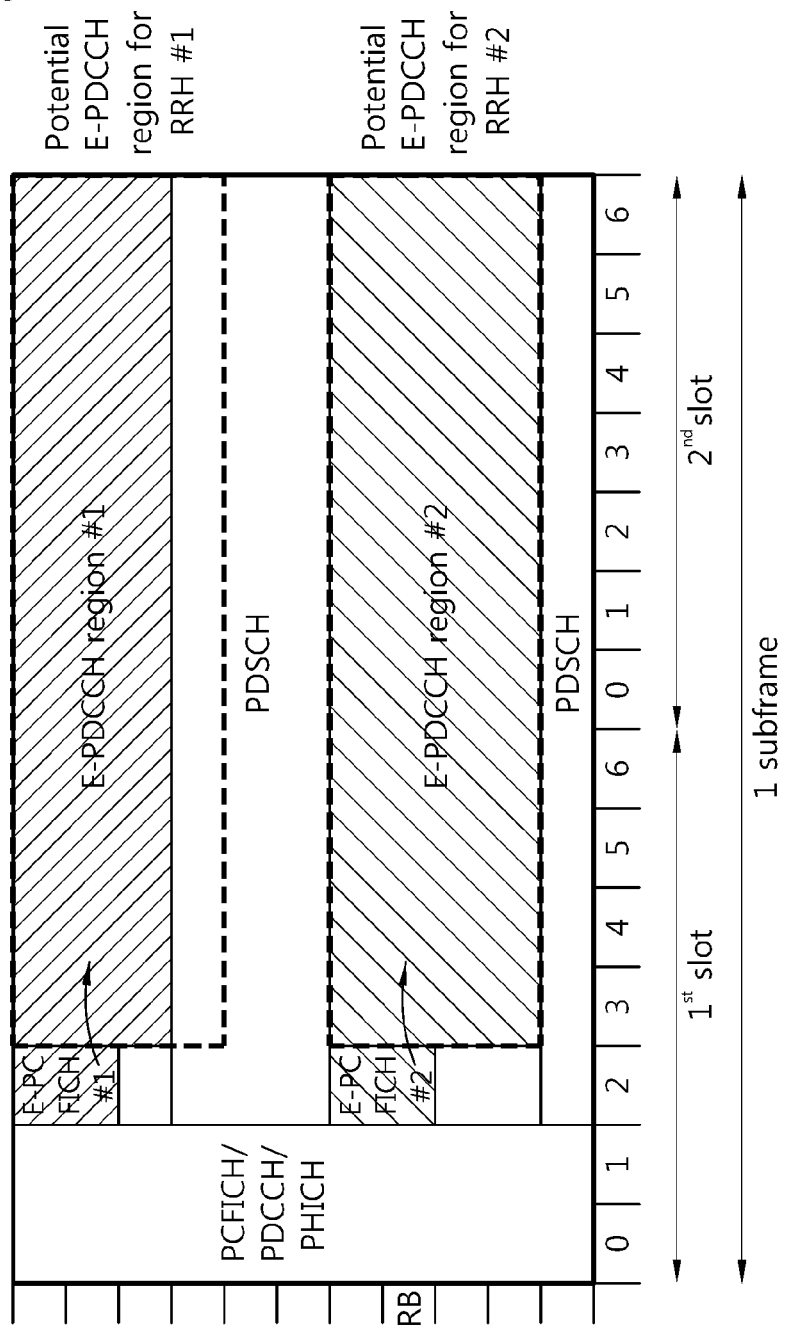
FIG. 13 shows an example in which an E-PCFICH is placed in RBs that form an E-PDCCH region.

FIG. 13 shows an example in which an E-PCFICH is placed in RBs that form an E-PDCCH region.

For example, assuming that a potential E-PDCCH region exists from a VRB #M to a VRB # (M+$L_{max}$), an E-PCFICH may be defined to exist from the VRB #M to a VRB #M+c. Here, c may be a constant smaller than $L_{max}$ and may be a predetermined value. That is, the size of the E-PCFICH may be smaller than that of the E-PDCCH region in the frequency domain and may be fixed.

Figure 14:
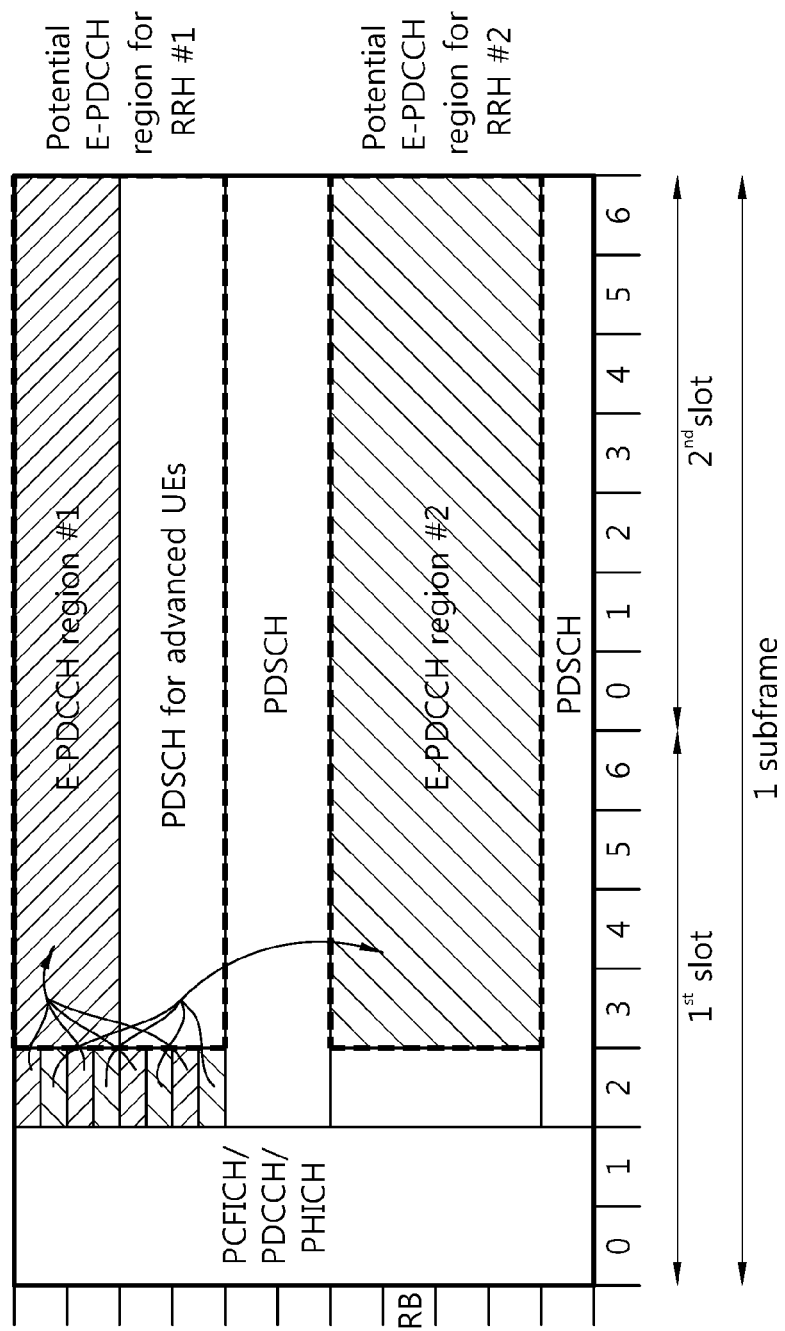
FIG. 14 shows an example in which an E-PCFICH is placed in some resource elements within RBs that form an E-PDCCH region.

FIG. 14 shows an example in which an E-PCFICH is placed in some resource elements within RBs that form an E-PDCCH region.

When there is a plurality of E-PDCCH regions, a plurality of E-PCFICH may be multiplexed within an RB forming a specific E-PDCCH region, as shown in FIG. 14. That is, an E-PCFICH does not exist within a specific RB of all E-PDCCH regions, but a plurality of E-PCFICHs exists only within a specific RB of a specific E-PDCCH region. Each of the E-PCFICHs provides information about the size of the frequency domain for a relevant E-PDCCH region.

If a plurality of E-PCFICHs is multiplexed within RBs that form a specific E-PDCCH region, the reference position of each E-PDCCH region may be previously designated instead of the position of the E-PCFICH, or UE may be informed of the reference position of each E-PDCCH region through a high layer signal, such as an RRC message. Furthermore, the E-PCFICH may be defined to exist in a designated position of a specific one of the plurality of E-PDCCH regions. UE receives E-CFIs from E-PCFICHs existing in the agreed RE or RB of the specific E-PDCCH region and obtains information about the size of the E-PDCCH regions from the received E-CFIs.

4. Position in the Time Domain of an E-PCFICH

An E-PCFICH may exist between the last symbol of a PDCCH and the start symbol of an E-PDCCH region in the time domain. This has advantages from two points of views. The first advantage is that processing delay can be minimized by placing an E-PCFICH in front of an E-PDCCH because the detection order of UE within a subframe is the E-PCFICH, the E-PDCCH, and a PDSCH. The second advantage is that a shock due to a change of the rules can be minimized because the frame structure of the E-PDCCH may almost comply with the frame structure of the R-PDCCH.

An R-PDCCH is placed in all REs of an RB determined in the frequency domain, and it may exist in i) the fourth to seventh OFDM symbols of a first slot, ii) the first to seventh OFDM symbols of a second slot, or iii) the first to sixth OFDM symbols of the second slot in the time domain. In accordance with the present invention, the two types of configurations i) and ii) from among the three types of configurations of the R-PDCCH may be reused to design an E-PDCCH. The configuration iii) may not be used in the E-PDCCH when the switching time of an RN is taken into consideration.

How the position of an E-PCFICH will be configured depending on the start position of an E-PDCCH region when the E-PCFICH exists is described below.

1) The Position of an E-PCFICH when the Start Symbol of an E-PDCCH is Fixed

If an E-PDCCH exists in the first slot of a subframe, a BS may send the E-PDCCH from a fixed position, that is, the fourth OFDM symbol of the subframe (a symbol index value is 3). Here, the E-PCFICH may exist during one or two symbol periods between the PDCCH region and the E-PDCCH region in the time domain. The start position of the E-PCFICH may follow one of the following.

i) A Control Format Indicator (CFI)+the First OFDM Symbol

This is a method in which the position of an E-PCFICH is dynamically changed according to a CFI. That is, a PDCCH region is dynamically changed over first to third OFDM symbol periods for each subframe according to the CFI. Here, the E-PCFICH exists right after the PDCCH region, that is, during one to two symbol periods from the second to fourth OFDM symbols of the subframe. In this case, the CFI may be limited so that it has only 1 or 2 because the E-PDCCH region exists from the fourth OFDM symbol. That is, the case where the CFI has a value of 3 is excluded. In summary, the three cases of Table 2 below may be supported.

TABLE 2

| CFI | Symbol Index(es) for PDCCH | Symbol Index(es) for E-PCFICH | Start Symbol of E-PDCCH |
|---|---|---|---|
| 1 | 0 | 1 | 3 |
| 1 | 0 | 1, 2 | 3 |
| 2 | 0, 1 | 2 | 3 |

Table 2 indicates OFDM symbol indices in the time domain of a PDCCH region, an E-PCFICH, and an E-PDCCH region according to a CFI (the index is started from 0). In Table 2, when CFI=1, two cases are possible depending on the number of transmission symbols of an E-PCFICH. Which one of the two cases will be used may be previously determined between a BS and UE or a BS may inform UE of it through a high layer signal. For example, if an E-PCFICH has been defined so that it is unconditionally transmitted for one symbol period, the second case of Table 2 is excluded.

ii) Fixed so that the Position of the E-PCFICH is Stared from a Third OFDM Symbol The E-PCFICH is defined as always existing in the position of the third OFDM symbol irrespective of a CFI. Even in this case, CFI=3 may be limited for the transmission of the E-PCFICH. In case of the method i), UE may know the position of the E-PCFICH in the time domain only when the UE recognizes a CFI through a PCFICH. In contrast, in case of the method ii), UE may know the position of the E-PCFICH in the time domain although the UE does not receive a CF. If the method ii) is applied, the following two cases as in Table 3 may be supported.

TABLE 3

| CFI | Symbol Index(es) for PDCCH | Symbol Index(es) for E-PCFICH | Start Symbol of E-PDCCH |
|---|---|---|---|
| 1 | 0 | 2 | 3 |
| 2 | 0, 1 | 2 | 3 |

In the above-described method, the frame structure of the E-PDCCH is identical with the frame structure of the R-PDCCH. This method is advantageous in that a shock due to a change of the rules can be minimized, but is disadvantageous in terms of resource efficiency. In particular, if CFI=1 and the transport period of an E-PCFICH is defined to be one OFDM symbol, there is a disadvantage in that one symbol is empty between the PDCCH, the E-PCFICH, and the E-PDCCH as can be seen from Table 2 and Table 3. In order to maximize resource efficiency, it is preferred that the start symbol of an E-PDCCH be flexibly operated depending on a CFI. The following method may be used by taking the flexible operation of the start symbol of the E-PDCCH into consideration.

2) The Position of an E-PCFICH when the Start Symbol of an E-PDCCH is Flexible

If the start symbol of an E-PDCCH is not fixed to the fourth OFDM symbol of a subframe, but may be flexibly changed, an E-PCFICH may exist during one or two symbols from a CFI+the first OFDM symbol, and the E-PDCCH may exist from a symbol right after the E-PCFICH.

Assuming that the number of transmission symbols is N in the time domain of an E-PCFICH, the E-PCFICH and an E-PDCCH region may be configured as in Table 4. Here, the number N of transmission symbols of the E-PCFICH may be previously defined (e.g., previously defined as N=1), or UE may be informed of the number N of transmission symbols through a high layer signal, such as an RRC message.

TABLE 4

| CFI | Symbol Index(es) for PDCCH | Symbol Index(es) for E-PCFICH | Start Symbol of E-PDCCH |
|---|---|---|---|
| 1 | 0 | 1, . . . , N | N + 1 |
| 2 | 0, 1 | 2, . . . , N + 1 | N + 2 |
| 3 | 0, 1, 2 | 3, . . . , N + 2 | N + 3 |

In accordance with a method, such as that of Table 4, there are disadvantages in that the standard rules need to be changed and a CFI must be received from a PCFICH in order to receive an E-PDCCH. However, there is an advantage in terms of resource efficiency because the start symbol of an E-PDCCH region is operated in conjunction with a CFI.

Figure 15:
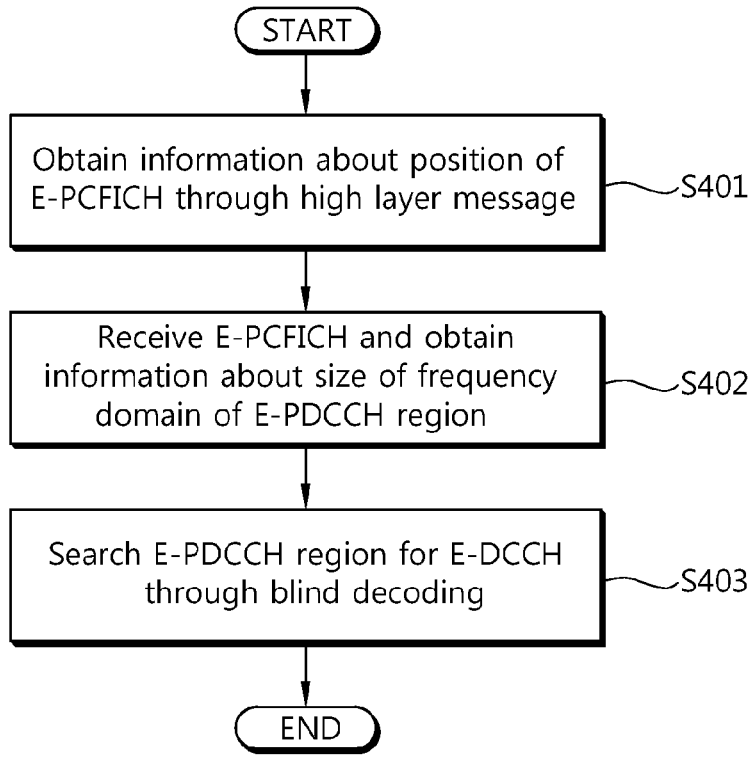
FIG. 15 shows an operation of UE according to an embodiment of the present invention.

FIG. 15 shows an operation of UE according to an embodiment of the present invention.

Referring to FIG. 15, UE obtains information about the position of an E-PCFICH through a high layer message at step S401. The high layer message may be an RRC message. That is, the information about the position of the E-PCFICH may be semi-statically configured.

The UE obtains information about the size of an E-PDCCH region in the frequency domain (i.e., an E-CFI) through the E-PCFICH at step S402. This process may be dynamically performed. That is, this process may be performed for each subframe. The E-PCFICH may be received in an OFDM symbol between the E-PDCCH region and a Physical Downlink Control Channel (PDCCH) that is transmitted in the first N (N is one of natural numbers 1 to 4) Orthogonal Frequency Division Multiplexing (OFDM) symbols of a subframe in the time domain.

The UE searches for an E-PDCCH by performing blind decoding on the E-PDCCH region at step S403. When the blind decoding is performed, the size of a search space may be determined depending on a value of the E-CFI. The E-PDCCH region may be any one of a plurality of E-PDCCH regions allocated to different frequency bands in the frequency domain of a subframe.

FIG. 15 shows an example in which information about the position of an E-PCFICH is directly informed through a high layer message, but not limited thereto. That is, if the position of an E-PDCCH region is associated with the position of an E-PCFICH, UE may extract the position of the E-PCFICH through the position of the E-PDCCH region. Accordingly, the position of the E-PDCCH region instead of the information about the position of the E-PCFICH may be informed through a high layer message.

The above-described methods, the E-PCFICH, and the E-PDCCH may be applied to not only a multi-node system, but other systems. For example, in a single node system, the above-described methods, the E-PCFICH, and the E-PDCCH may be applied for efficient DCI transmission using a DM-RS and for an increased PDCCH capacity. Furthermore, when cross-carrier scheduling is applied in a carrier aggregation, a DCI for a secondary cell may be transmitted by a primary cell. In this case, in order to solve the shortage of a PDCCH capacity in the primary cell, the E-PCFICH and the E-PDCCH proposed in the present invention may be applied.

Figure 16:
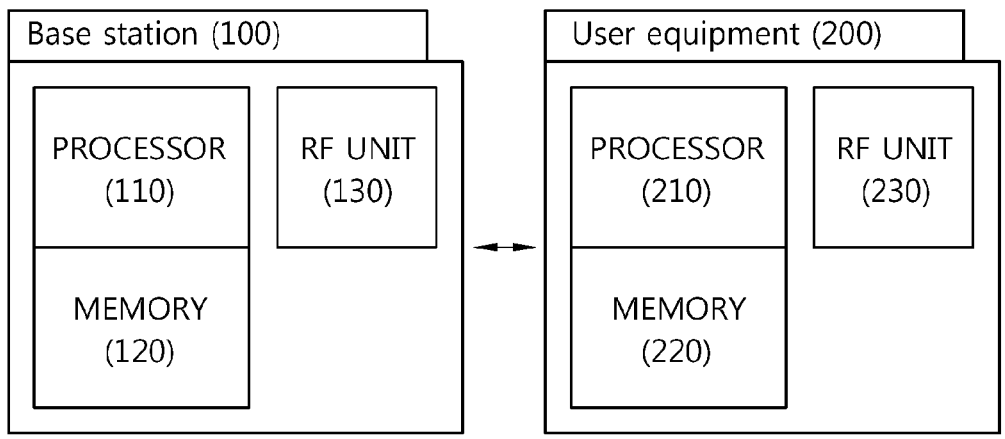
FIG. 16 is a block diagram showing of a BS and UE.

FIG. 16 is a block diagram showing of a BS and UE.

The BS 100 includes a processor 110, memory 120, and a Radio Frequency (RF) unit 130. The processor 110 implements the proposed functions, processes and/or methods. For example, the processor 110 may send information about the position of an E-PCFICH to UE through a high layer signal and send information about the size of an E-PDCCH region in the frequency domain to UE through the E-PCFICH. Control information about each node may be transmitted in the E-PDCCH region. The memory 120 is coupled to the processor 110 and configured to store various pieces of information necessary to drive the processor 110. The RF unit 130 is coupled to the processor 110 and configured to send and/or receive radio signals.

The UE 200 includes a processor 210, memory 220, and an RF unit 230. The processor 210 implements the proposed functions, processes and/or methods. For example, the processor 210 may obtain information about the position of an E-PCFICH through a high layer signal and obtain information about the size of an E-PDCCH region in the frequency domain through the E-PCFICH. Furthermore, the processor 210 may search the E-PDCCH region for its own E-PDCCH through blind decoding. The memory 220 is coupled to the processor 210 and configured to store various pieces of information necessary to drive the processor 210. The RF unit 230 is coupled to the processor 210 and configured to send and/or receive radio signals.

The processor 110, 210 may include Application-Specific Integrated Circuits (ASICs), other chipsets, logic circuits, data processors and/or a converter for converting a baseband signal and a radio signal and the vice versa. The OFDM transmitter and the OFDM receiver of FIG. 7 may be implemented within the processor 110, 210. The memory 120, 220 may include Read-Only Memory (ROM), Random Access Memory (RAM), flash memory, memory cards, storage media and/or other storage devices. The RF unit 130, 230 may include one or more antennas for sending and/or receiving radio signals. When the embodiment is implemented in software, the above-described scheme may be implemented using a module (process or function) that performs the above function. The module may be stored in the memory 120, 220 and executed by the processor 110, 210. The memory 120, 220 may be placed inside or outside the processor 110, 210 and connected to the processor 110, 210 using a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for receiving control information in a wireless communication system, the method comprising:
    receiving, by a user equipment (UE), first information related to a position of an Enhanced-Physical Control Format Indication Channel (E-PCFICH) from a base station;
    receiving, by the UE, the E-PCFICH based on the first information related to the position of the E-PCFICH;
    obtaining, by the UE, second information related to a frequency band of an Enhanced Physical Downlink Control Channel (E-PDCCH) region through the E-PCFICH; and
    searching, by the UE, the E-PDCCH region for an E-PDCCH based on the second information,
    wherein the E-PCFICH is received in an orthogonal frequency division multiplexing (OFDM) symbol between a Physical Downlink Control Channel (PDCCH) and the E-PDCCH region,
    wherein the PDCCH is received in first N OFDM symbols of a subframe in a time domain,
    wherein N is one of natural numbers 1 to 4,
    wherein the first information related to the position of the E-PCFICH is semi-statically configured, and
    wherein the second information related to the frequency band of the E-PDCCH region is dynamically changed for each subframe.

2. The method of claim 1, wherein the E-PDCCH region is any one of a plurality of E-PDCCH regions allocated to different frequency bands in a frequency domain of the subframe.

3. The method of claim 1, wherein the E-PCFICH exists in a specific position of resource blocks forming the E-PDCCH region.

4. The method of claim 1, wherein the E-PCFICH includes third information related to a number of resource blocks forming the E-PDCCH region.

5. The method of claim 1, wherein the second information indicates a frequency band for one E-PDCCH region.

6. The method of claim 1, wherein the second information indicates a plurality of frequency bands for a plurality of E-PDCCH regions.

7. The method of claim 1, wherein the E-PDCCH region includes fourth information related to a scheduling of data transmitted in any one of a plurality of nodes controlled by the base station.

8. The method of claim 1, wherein the E-PDCCH region is started from an OFDM symbol fixed in the subframe.

9. A user equipment comprising:
a memory: and
a processor coupled to the memory, the processor configured to:
receive first information related to a position of an Enhanced-Physical Control Format Indication Channel (E-PCFICH) from a base station,
receive the E-PCFICH based on the first information related to the position of the E-PCFICH,
obtain second information related to a frequency band of an Enhanced Physical Downlink Control Channel (E-PDCCH) region through the E-PCFICH, and
search the E-PDCCH region for an E-PDCCH based on the second information,
wherein the E-PCFICH is received in an orthogonal frequency division multiplexing (OFDM) symbol between a Physical Downlink Control Channel (PDCCH) and the E-PDCCH region,
wherein the PDCCH is received in first N OFDM symbols of a subframe in a time domain,
wherein N is one of natural numbers 1 to 4,
wherein the first information related to the position of the E-PCFICH is semi-statically configured, and
wherein the second information related to the frequency band of the E-PDCCH region is dynamically changed for each subframe.

10. The user equipment of claim 9, wherein the E-PDCCH region is any one of a plurality of E-PDCCH regions allocated to different frequency bands in a frequency domain of the subframe.

* * * * *